US012357997B2

(12) United States Patent
Cole et al.

(10) Patent No.: US 12,357,997 B2
(45) Date of Patent: Jul. 15, 2025

(54) CRUSHER WITH RESETTABLE RELIEF SYSTEM

(71) Applicant: Eagle Crusher Company, Inc., Galion, OH (US)

(72) Inventors: James T. Cole, Galion, OH (US); Allen Wagner, Galion, OH (US)

(73) Assignee: Eagle Crusher Company, Inc., Galion, OH (US)

( * ) Notice: Subject to any disclaimer, the term of this patent is extended or adjusted under 35 U.S.C. 154(b) by 25 days.

(21) Appl. No.: 18/120,143

(22) Filed: Mar. 10, 2023

(65) Prior Publication Data

US 2023/0226554 A1 Jul. 20, 2023

Related U.S. Application Data

(63) Continuation of application No. 17/003,292, filed on Aug. 26, 2020, now Pat. No. 11,602,755.

(60) Provisional application No. 62/892,205, filed on Aug. 27, 2019.

(51) Int. Cl.
*B02C 1/02* (2006.01)
*B02C 1/00* (2006.01)

(52) U.S. Cl.
CPC .............. *B02C 1/025* (2013.01); *B02C 1/005* (2013.01)

(58) Field of Classification Search
CPC ................................ B02C 1/025; B02C 1/005
See application file for complete search history.

(56) References Cited

U.S. PATENT DOCUMENTS

| | | | | |
|---|---|---|---|---|
| 427,441 A * | 5/1890 | Roth | B02C 1/005 241/266 |
| 1,901,159 A * | 3/1933 | Guest | B02C 1/025 241/32 |
| 2,588,180 A | 3/1952 | Traylor, Jr. | |
| 2,620,629 A * | 12/1952 | Gauldie | B02C 1/005 60/543 |
| 3,861,604 A | 1/1975 | Nobelius | |
| 3,918,648 A | 11/1975 | Anthony | |
| 4,165,044 A | 8/1979 | Batch | |

(Continued)

FOREIGN PATENT DOCUMENTS

| | | | |
|---|---|---|---|
| CN | 101607220 A | 12/2009 | |
| CN | 204583284 U | 8/2015 | |
| CN | 106000519 * | 10/2016 | B02C 1/005 |

OTHER PUBLICATIONS

ISSU, 2015 Generic Hydraulic Toggle Manual, webpage, published Oct. 19, 2015, 4 pages.

(Continued)

*Primary Examiner* — Matthew Katcoff
(74) *Attorney, Agent, or Firm* — Standley Law Group LLP; Jeffrey S. Standley; Adam J. Smith

(57) ABSTRACT

A crusher apparatus includes a material crushing portion with a first crushing portion adapted for movement toward a second crushing portion. A linkage subassembly is connected to the first crushing portion and includes a first and second member operable about a pivot. A force inducing subsystem exerts a counterforce of a predetermined threshold amount to the first and second members sufficient to maintain the linkage subassembly in an unrelieved position until a crushing force exerted on the first crushing portion is sufficient to cause the linkage subassembly to move into a relieved position.

18 Claims, 19 Drawing Sheets

(56) References Cited

U.S. PATENT DOCUMENTS

| | | | |
|---|---|---|---|
| 4,244,532 A | 1/1981 | Kroening et al. | |
| 4,398,674 A | 8/1983 | Dremann | |
| 4,783,013 A | 11/1988 | Polzin | |
| 4,886,217 A * | 12/1989 | van der Wal | B02C 1/005 241/269 |
| 4,927,089 A | 5/1990 | Altmayer | |
| 4,989,797 A | 2/1991 | DeDiemar et al. | |
| 5,005,775 A | 4/1991 | Jakobs | |
| 5,060,874 A | 10/1991 | Sidney, Jr. et al. | |
| 5,397,069 A | 3/1995 | Kitsukawa et al. | |
| 5,570,850 A | 11/1996 | Kay | |
| 5,647,545 A | 7/1997 | Conner | |
| 5,725,166 A | 3/1998 | Nakayama et al. | |
| 5,765,769 A | 6/1998 | Kaya | |
| 5,769,334 A | 6/1998 | Nakayama et al. | |
| 5,799,888 A | 9/1998 | Hamaguchi et al. | |
| 5,857,630 A | 1/1999 | Hamaguchi et al. | |
| 5,878,967 A | 3/1999 | Conner | |
| 5,878,969 A | 3/1999 | Kaya | |
| 6,186,311 B1 | 2/2001 | Conner | |
| 6,375,105 B1 | 4/2002 | Haven et al. | |
| 6,619,576 B2 | 9/2003 | Togashi et al. | |
| 6,644,577 B2 | 11/2003 | Togashi | |
| 7,168,644 B2 | 1/2007 | Togashi et al. | |
| 7,341,213 B2 | 3/2008 | Boast | |
| 7,614,573 B1 | 11/2009 | Jean | |
| 7,708,218 B2 | 5/2010 | Nakayama et al. | |
| 7,980,501 B2 | 7/2011 | Ueda | |
| 8,757,530 B2 | 6/2014 | Sutti et al. | |

| | | |
|---|---|---|
| 8,905,337 B2 | 12/2014 | Eriksson et al. |
| 9,272,283 B2 | 3/2016 | Ito et al. |
| 9,421,547 B2 | 8/2016 | Boast et al. |
| 9,873,123 B2 | 1/2018 | Jonkka |
| 2002/0036246 A1 | 3/2002 | Togashi et al. |
| 2003/0034412 A1 | 2/2003 | Togashi |
| 2004/0094644 A1 | 5/2004 | Douglas et al. |
| 2004/0129815 A1 | 7/2004 | Togashi et al. |
| 2005/0082403 A1 | 4/2005 | Boast |
| 2006/0202075 A1 | 9/2006 | Young et al. |
| 2009/0152387 A1 | 6/2009 | Nakayama et al. |
| 2010/0206975 A1 | 8/2010 | Ueda |
| 2011/0253823 A1 | 10/2011 | Murai |
| 2012/0199680 A1 | 8/2012 | Ueda |
| 2013/0043335 A1 | 2/2013 | Sutti et al. |
| 2013/0153697 A1 | 6/2013 | Ito et al. |
| 2013/0320123 A1 | 12/2013 | Boast et al. |
| 2014/0239101 A1 | 8/2014 | Eriksson et al. |
| 2014/0239103 A1 | 8/2014 | Murai |
| 2015/0352555 A1 | 12/2015 | Svensson et al. |
| 2017/0065983 A1 | 3/2017 | Sutti |
| 2017/0106372 A1 | 4/2017 | Jonkka |
| 2018/0071742 A1 | 3/2018 | Grimm et al. |
| 2018/0250679 A1 | 9/2018 | Engel et al. |
| 2018/0250680 A1 | 9/2018 | Martinez, Jr. et al. |

OTHER PUBLICATIONS

Automatic Welding Inc., Home of the Hydraulic Toggle, Information Sheet, accessed Aug. 23, 2019, 8 pages.

* cited by examiner

CRUSHER WITH RESETTABLE RELIEF SYSTEM

CROSS-REFERENCE TO RELATED APPLICATIONS

This application is a continuation of U.S. application Ser. No. 17/003,292 filed Aug. 26, 2020, now U.S. Pat. No. 11,602,755, which claims the benefit of U.S. Provisional Patent Application No. 62/892,205 filed Aug. 27, 2019, the disclosures of which are hereby incorporated by reference as if fully restated herein.

TECHNICAL FIELD

Exemplary embodiments relate generally to a crusher with a resettable relief system.

BACKGROUND AND SUMMARY OF THE INVENTION

A number of crusher devices exist which are generally used to crush rock, concrete, and other materials into smaller pieces for a variety of uses, such as but not limited to, recycling. One type of crusher is a jaw crusher. A jaw crusher generally operates by oscillating a first plate in relation to a second plate. The first and second plates are generally spaced apart from one another at an angle such that an upper opening is wider than a bottom opening, thus forming a "jaw" like shape. Rocks and other material are deposited in the first opening and subsequently crushed during the oscillating movement of the first plate towards the second plate. Rocks and other material below a certain size may be permitted to fall through the second opening.

Occasionally, the crusher may become jammed, such as when material is deposited within the device that is incapable of being crushed. This is particularly common in recycling applications. For example, without limitation, concrete may be deposited within the crusher which contains rebar. The crusher may not be capable of safely crushing the rebar.

It is known to provide relief bars between the first, movable plate, and one or more other components of the crusher, such as a frame. For example, the relief bar may be attached to a rear side of the first plate near the second opening and extend in a linear manner to the frame. These relief bars may be engineered to fail when experiencing a predetermined amount of force or stress. Upon failure, the machine typically must be shut off and a replacement bar must be obtained and installed prior to resuming operation.

It is also known to provide hydraulic relief devices. These hydraulic relief devices typically are provided in the same place as the relief bars. These hydraulic relief devices may be engineered to collapse when experiencing a predetermined amount of force or stress. Upon failure, the hydraulic relief devices may be reset by applying an appropriate amount of pressure. However, these hydraulic relief devices generally require exceedingly high levels of pressure for operation. Such pressures may be in the range of 7,000 psi. Such high levels of pressure may pose safety hazards and/or require specialty training, certification, or the like to operate on.

What is needed is crusher device with a resettable relief system. A crusher device with a resettable relief system is provided. A hydraulic device may be provided. The hydraulic device may be oriented substantially vertically below a frame for the crusher. A first and second member may extend from a pivot on both sides of the hydraulic device. The first member may be attached to a first linkage member and a first end linkage member by way of a first shaft. The second member may be attached to the second linkage member and a second end linkage member by way of a second shaft. A piston of the hydraulic device may be attached to a third shaft extending between the first and second linkage members. The first end linkage member may be moveably connected to the frame such that the position of a first plate may be adjusted relative to a second plate. The second end linkage member may be received within, or otherwise connected to, a lower portion of the first plate.

The hydraulic device may be configured to apply a substantially vertical force to maintain the first and second linkage members at a substantially flat or slightly upwards or downwards angle to facilitate normal operations. If a force is experienced above a certain threshold, the hydraulic device may be allowed to extend or retract such that the first and second linkage member may be allowed to rotate upwards or downwards to form a peak or a valley, thereby allowing the first and second end linkage members to move closer to one another. As a result, the first plate may be allowed to move away from the second plate, thereby relieving pressure against the first plate and potentially permitting deposited material to exit the crusher.

The resettable relief system may be capable of operating at relatively low pressures compared to known hydraulic relief devices. In known hydraulic relief devices, the forces exerted must be at least equal to the forces exerted by the jaw during normal operations as they are exerted directly against the jaw. Lower operating pressures may be achieved with the resettable relief system by way of a column loading effect. For example, without limitation, the force exerted need only be sufficient to prevent the resettable device from moving into the relieved position (e.g., buckling). This force may be less than the forces exerted directly by the jaw, at least during normal operations. Alternatively, or additionally, lower operating pressures may be achieved by way of one or more of the aforementioned components, which may provide a mechanical advantage, such as by a lever effect.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
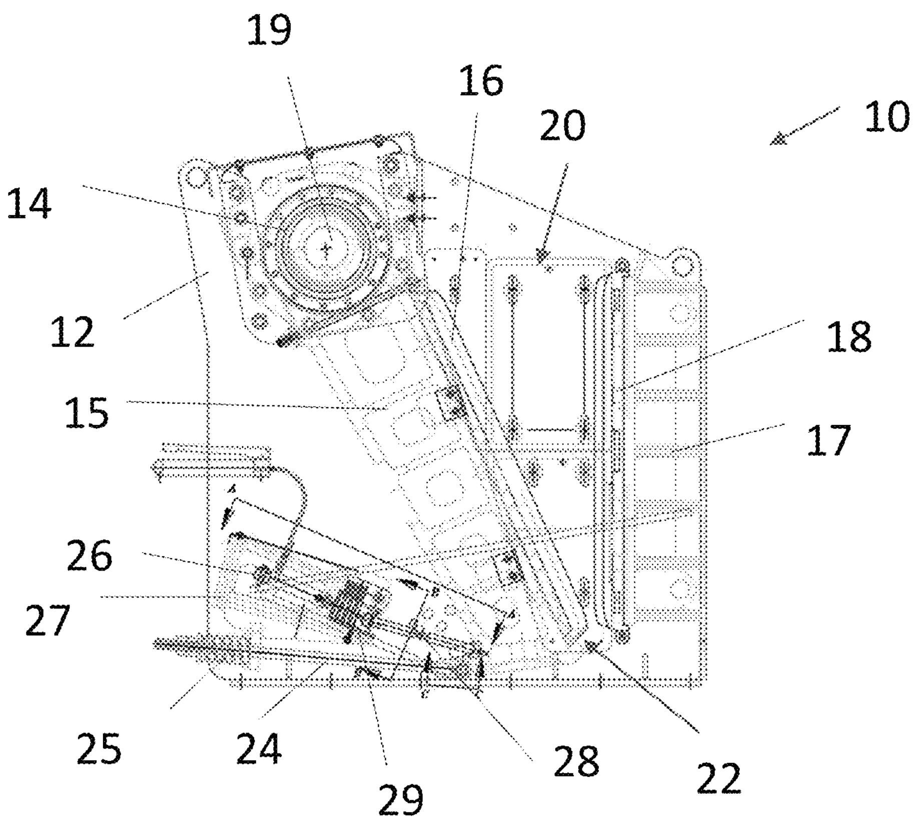
Figure 1 (Prior art)
FIG. 1 is a side sectional view of a prior art relief bar installed on a crusher.

FIG. 1 is a side sectional view of an exemplary prior art jaw crusher 10. The crusher 10 may comprise a frame 12. The frame 12 may be comprised of one or more members. The frame 12 may be provided in various sizes and shapes. The crusher 10 may include one or more bearings 14 for a driveshaft 19, which may be mounted to the frame 12. Rotational movement of the driveshaft 19 may be configured to drive a first section 15 towards a second section 17 in an oscillating manner. The first section 15 may comprise a first crushing portion 16 mounted thereto. The second section 17 may comprise a second crushing portion 18 mounted thereto. In exemplary embodiments, the first and second crushing portion 16 and 18 may comprise one or more plates, members, surface features, some combination thereof, or the like which configure the first and second crushing portions 16 and 18 for crushing materials therebetween. For example, without limitation, the first and second crushing portion 16 and 18 may comprise a number of ridges, grooves, roughed surfaces, protrusions, depressions, bumps, cones, some combination thereof, or the like.

In exemplary embodiments, the second crushing portion 18 may be oriented substantially vertically. The first crushing portion 16 may be oriented at an angle relative to the second crushing portion 18. An upper opening 20 may be formed between upper portions of the first and second crushing portion 16 and 18. The upper opening 20 may be larger than a lower opening 22 formed between lower portions of the first and second crushing portion 16 and 18. The first and second crushing portion 16 and 18 may form a jaw or wedge shape, in exemplary embodiments. The upper opening 20 may be sized to accept rocks or other material of a relatively large size. The rocks and other material deposited in the upper opening 20 may be crushed into relatively smaller pieces as the first crushing portion 16 is moved relative to the second crushing portion 18. The rocks and other material may be further crushed into further smaller pieces as they move towards the lower opening 22. The lower opening 22 may be sized to allow rocks and other material below a certain size to leave the crusher 10.

A member 24 may be connected to said frame 12 at a first end thereof and a lower portion of said second crushing portion 18 at a second end thereof. The member 24 may assist in securing the position of the first crushing portion 16 relative to the second crushing portion 18, particularly to form the angle between the first and second crushing portion 16 and 18. The member 24 may be mounted to said frame 12 by way of a spring 25. The spring 25 and/or member 24 may provide forces which assist in movement the second section 17 relative to the first section 15.

A positioning assist device 26 may be mounted to said frame 12. The positioning assist device 26 may be located within a housing 27, though such is not required. The positioning assist device 26 may be configured to secure the position of the first crushing portion 16 relative to the second crushing portion 18. The positioning assist device 26 may be configured to provide adjustability to the size of the lower opening 22. Alternatively, or additionally, one or more shims 29 may be utilized with the positioning assist device 26 to provide adjustability to the size of the lower opening 22. The positioning assist device 26 and/or shims 29 may be used to move the first crushing portion 16 between an extended position, whereby the first crushing portion 16 is located closer to the second crushing portion 18 (thereby decreasing the size of the lower opening 22), a retracted position, whereby the first crushing portion 16 is located further from the second crushing portion 18 (thereby increasing the size of the lower opening 22), and/or any number of positioned therebetween.

A relief bar 28 may extend between the housing 27 and the second crushing portion 18. The relief bar 28 may be configured to fail when a certain amount of force and/or stress is experienced. The relief bar 28 may require replacement upon failure. Replacement may require stopping the crusher 10, removing the failed relief bar 28, obtaining a replacement relief bar 28, discarding the failed relief bar 28, and installation of the replacement relief bar 28. Alternatively, it has been known to use a hydraulic piston in the position of the relief bar 28. However, such hydraulic pistons require significant pressures for operation.

Figure 2:
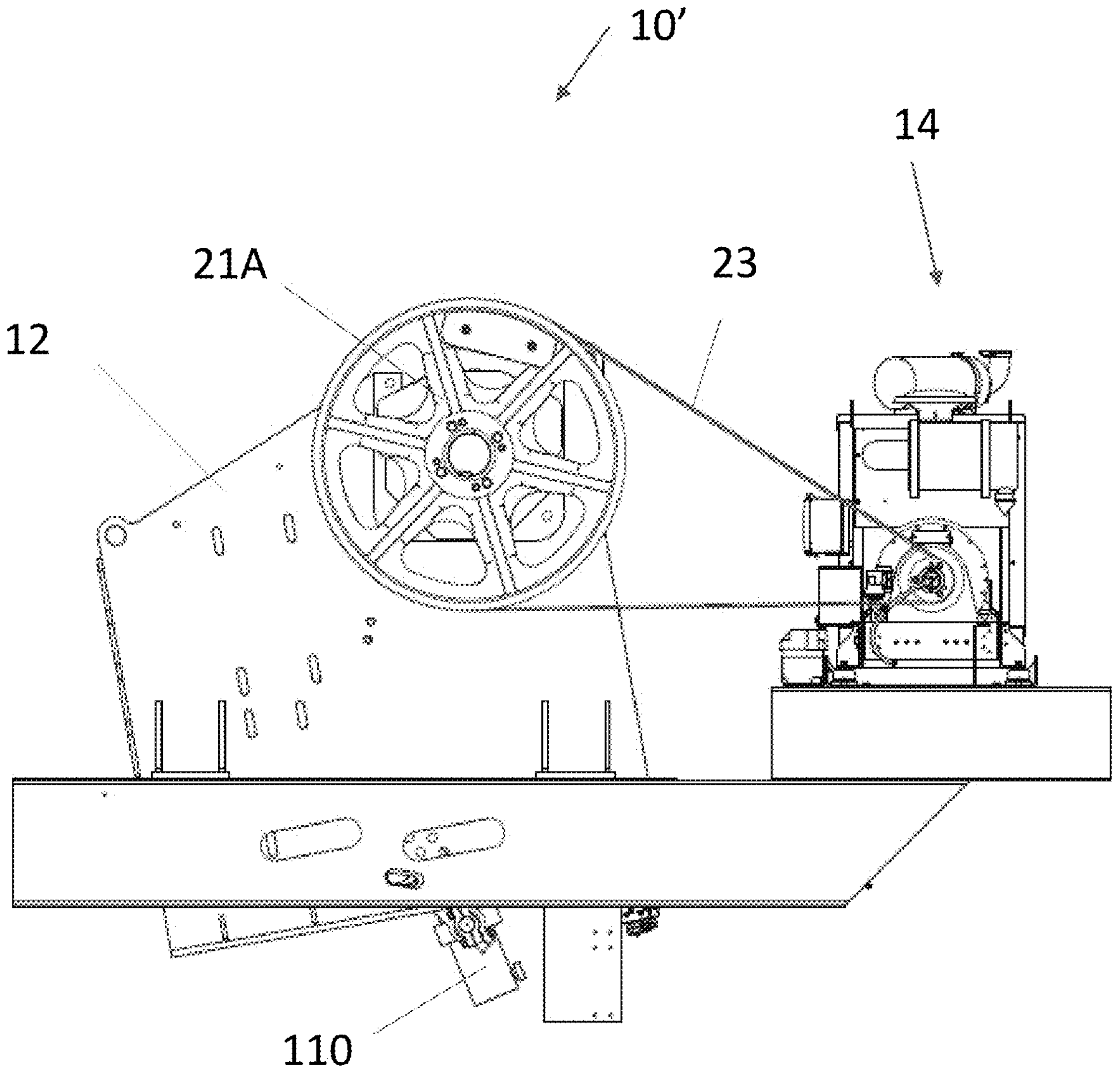
FIG. 2 is a side view of an exemplary crusher with an exemplary resettable relief system in accordance with the present invention.
Figure 3:
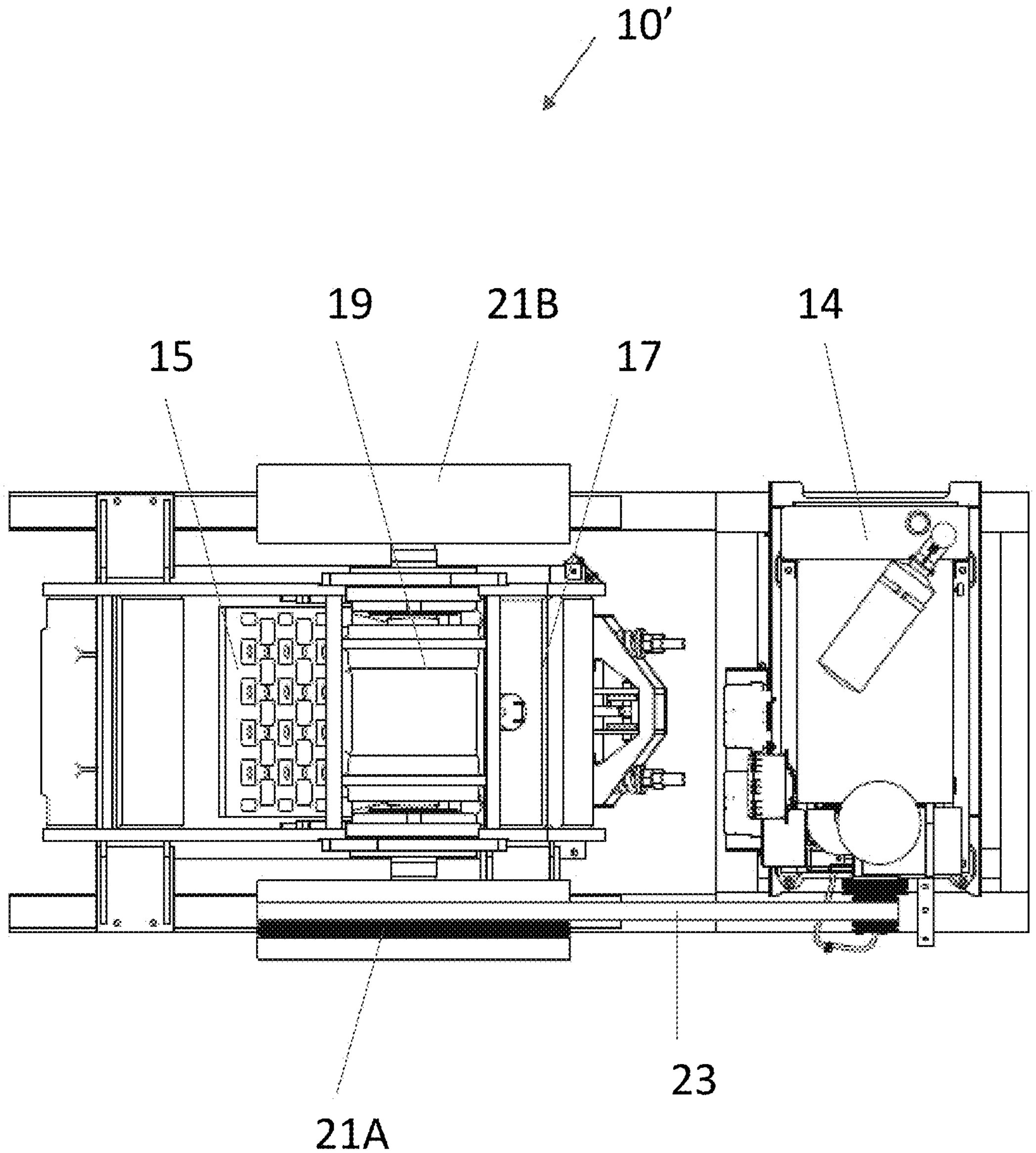
FIG. 3 is a top view of the exemplary crusher of FIG. 2.

FIG. 2 and FIG. 3 illustrate an exemplary crusher 10' with an exemplary resettable relief system 100. One or more motors 14 may be connected the driveshaft 19, such as by way of a first flywheel 21A and a belt 23. The first flywheel 21A may comprise a groove configured to accommodate the belt 23. However, other mechanical connections between the motors 14 and the driveshaft 19 may be utilized, such as but not limited to, gears, chains, pulleys, combinations thereof, and the like. The motors 14 may comprise, for example without limitation, diesel engines, gasoline engines, electric motors, combinations thereof, or the like. A second flywheel 21B of the same or different size, type, shape, or the like may be located at a second end of the driveshaft 19. In exemplary embodiments the driveshaft 19 may comprise an eccentric shape configured to facilitate oscillating movement of the first section 15 relative to the second section 17.

Figure 4:
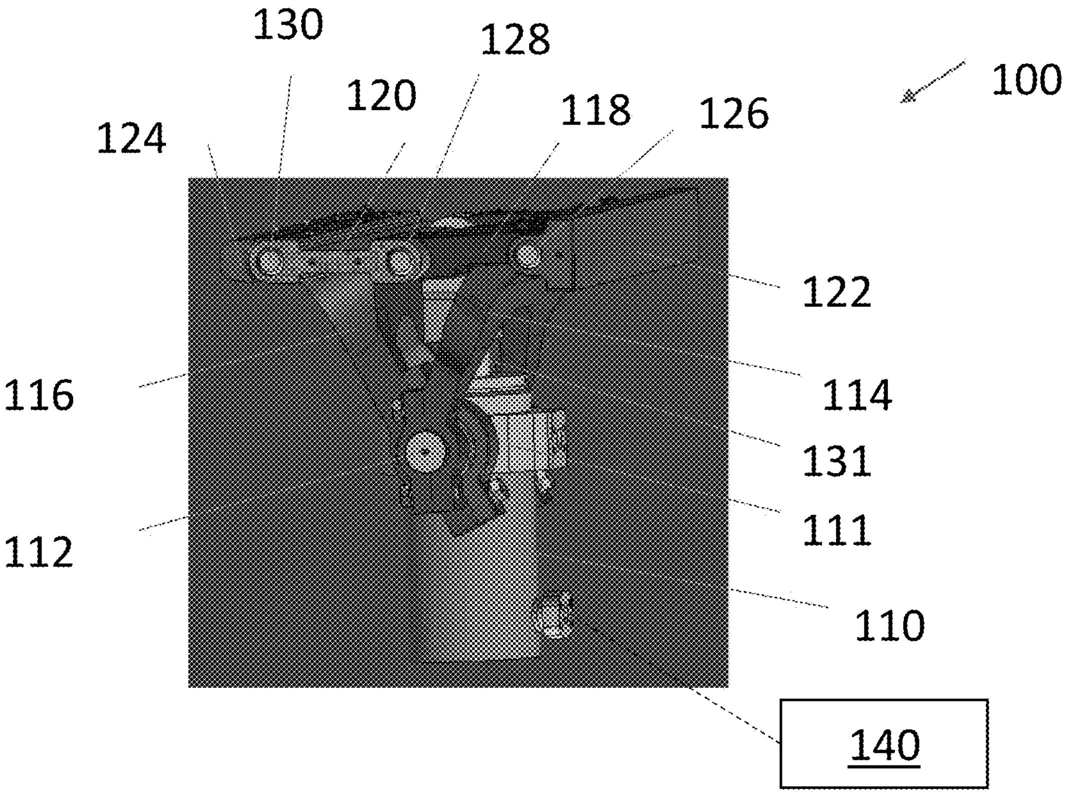
FIG. 4 is a side perspective view of a resettable relief system in an unrelieved position illustrated in insolation from other components of the crusher.
Figure 5:
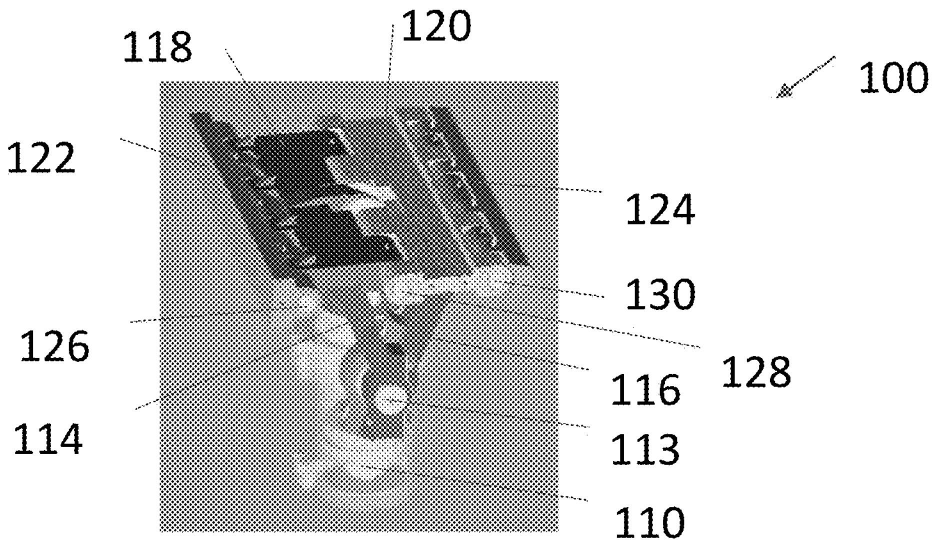
FIG. 5 is a top perspective view of the resettable relief system of FIG. 4.
Figure 6:
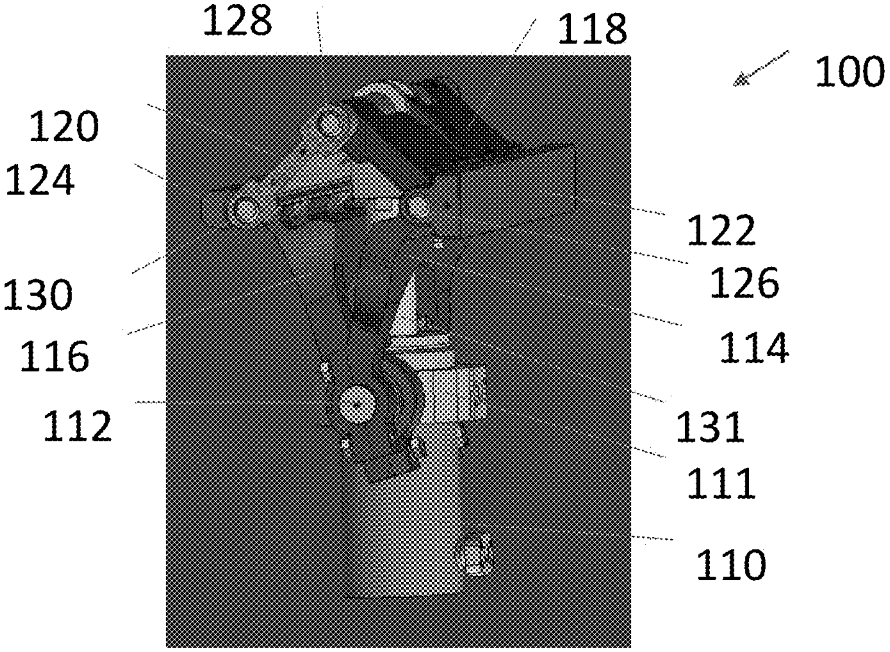
FIG. 6 is a side perspective view of the resettable relief system of FIG. 4 in a relieved position.
Figure 7:
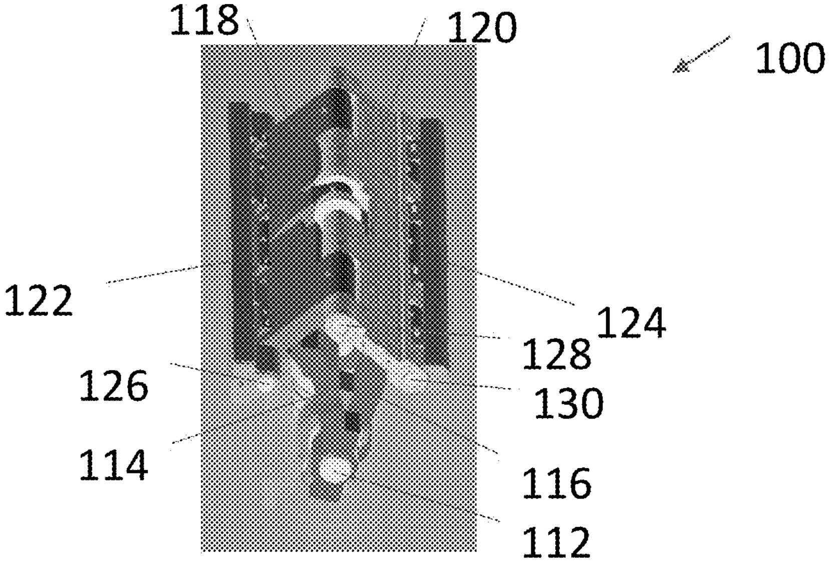
FIG. 7 is a top perspective view of the resettable relief system of FIG. 4 in the relieved position.
Figure 8:
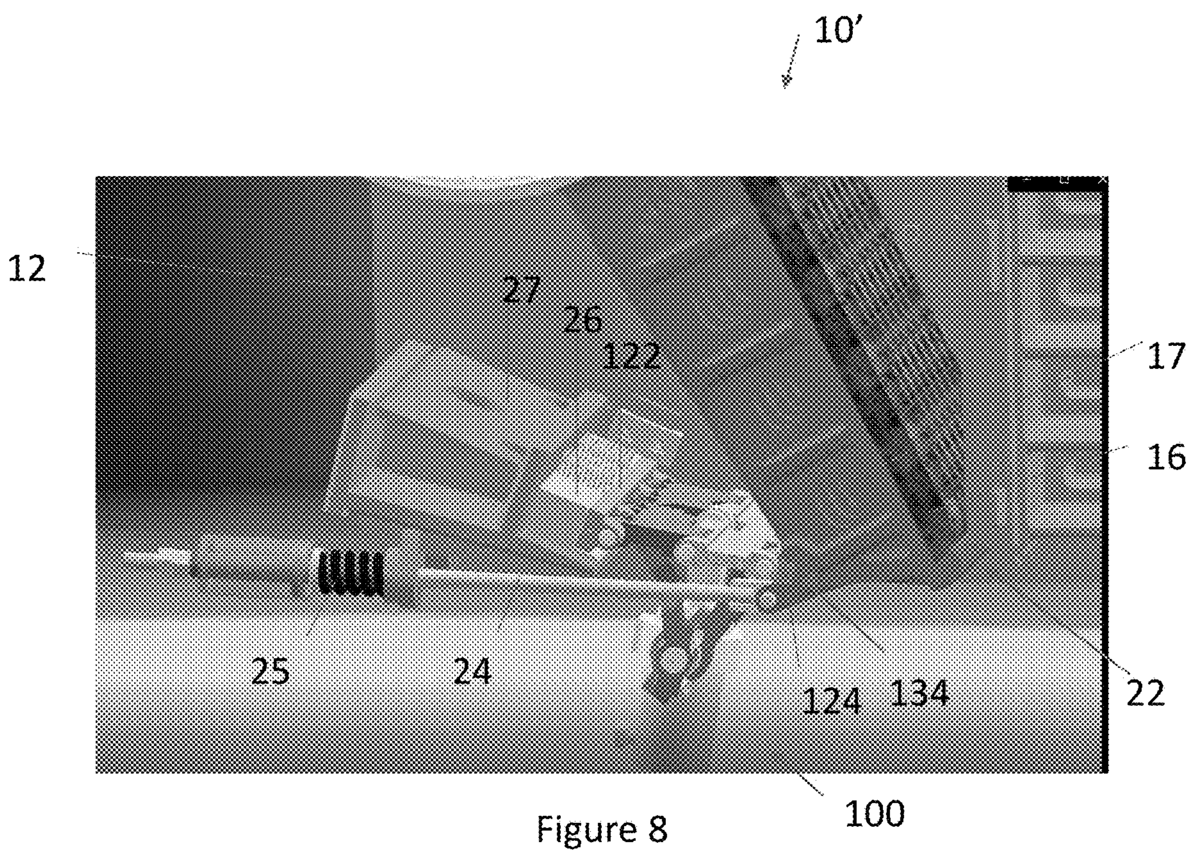
FIG. 8 is a side perspective view of the resettable relief system of FIG. 4 installed on an exemplary crusher and in the unrelieved position.
Figure 9:
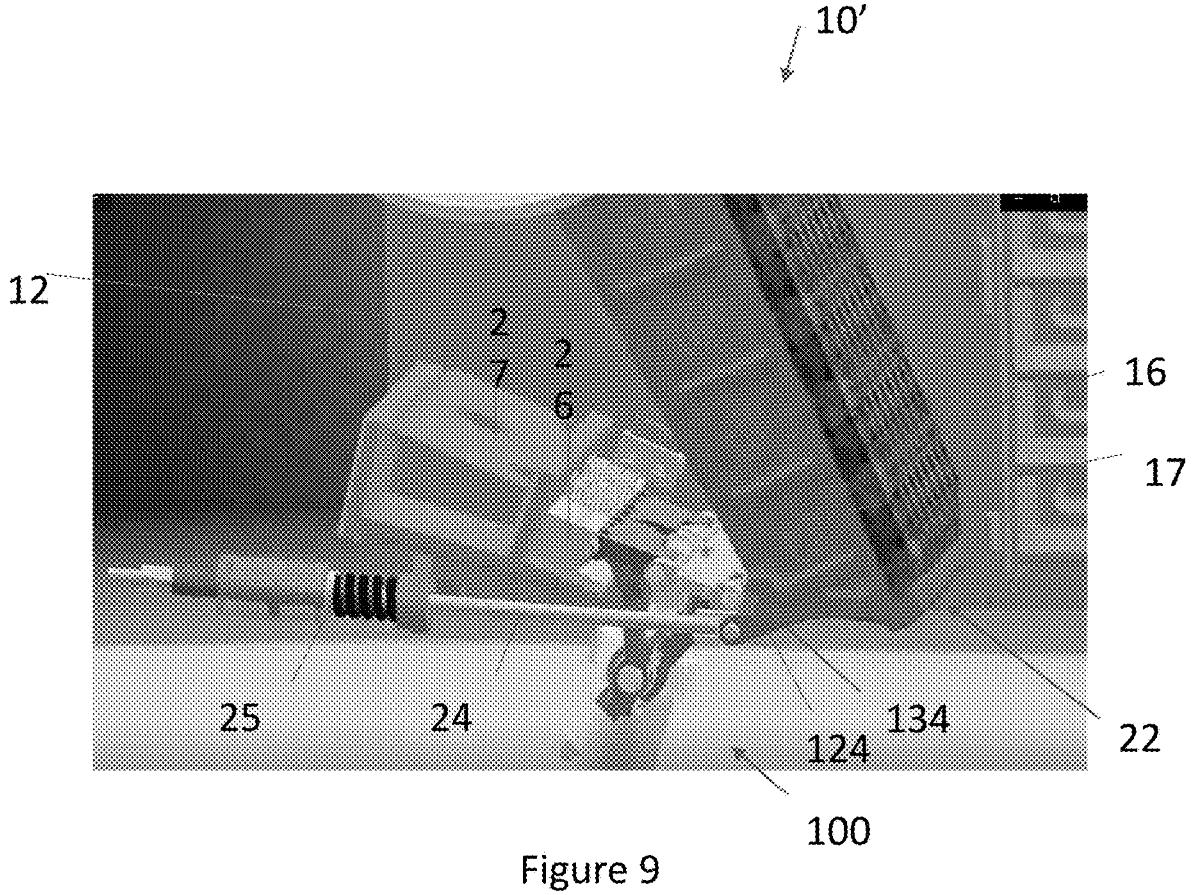
FIG. 9 is a side perspective view of the resettable relief system of FIG. 8 in a retracted position.
Figure 10:
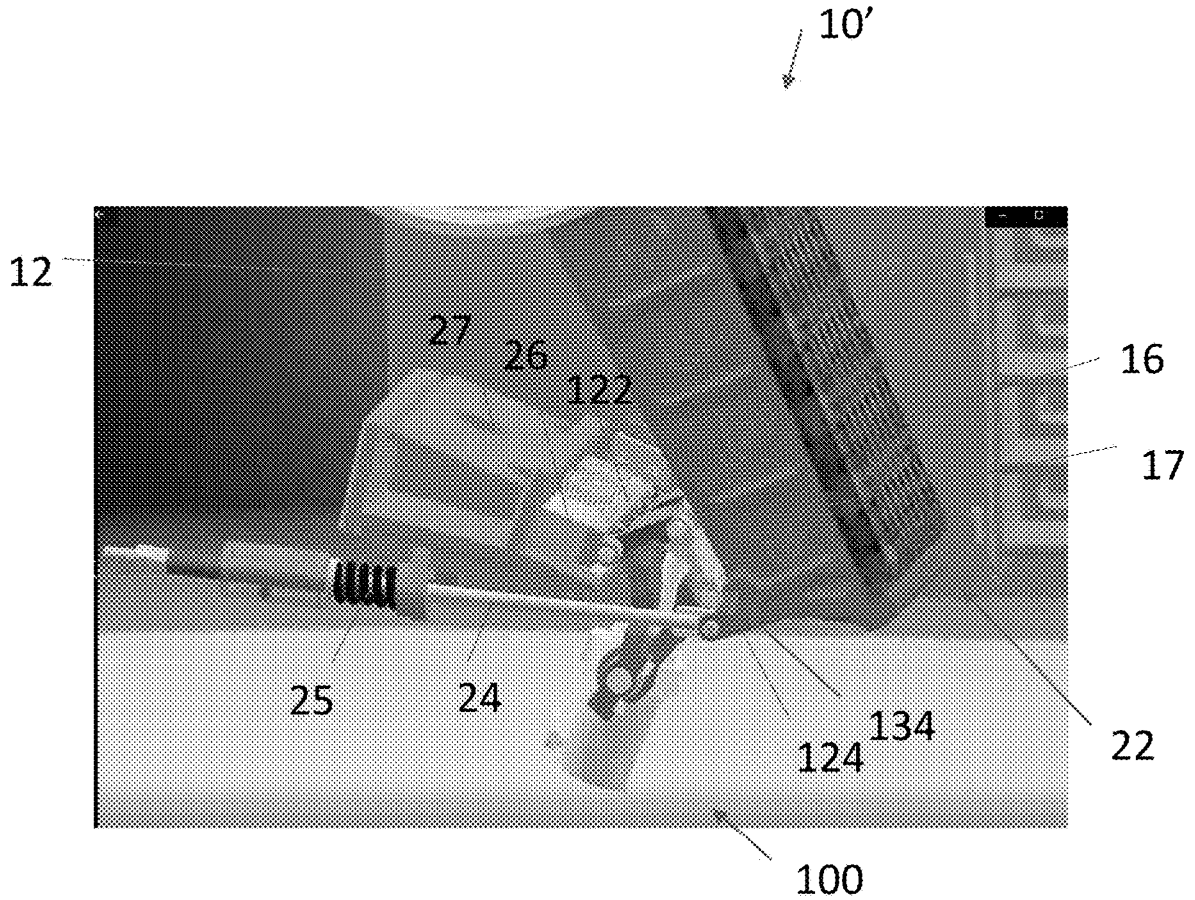
FIG. 10 is a side perspective view of the resettable relief system of FIG. 8 in the relieved position.
Figure 11:
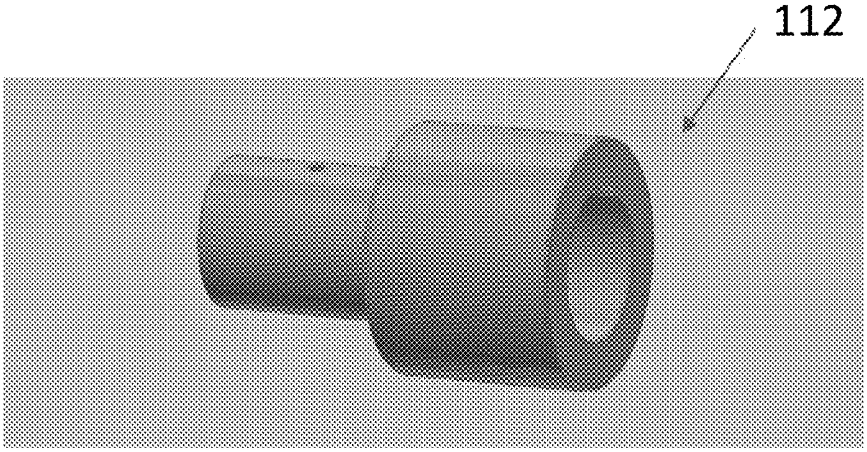
FIG. 11 is a perspective view of an exemplary pivot of the resettable relief system.
Figure 12A:
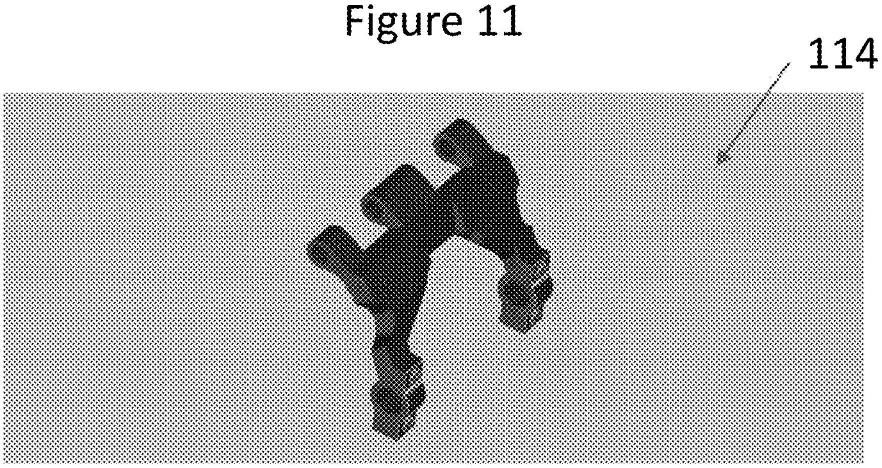
FIG. 12A is a perspective view of an exemplary first member of the resettable relief system.
Figure 12B:
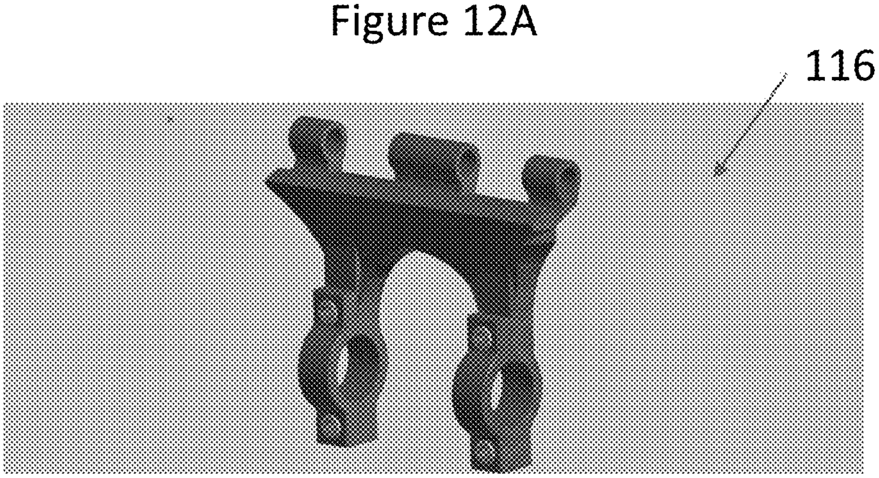
FIG. 12B is a perspective view of an exemplary second member of the resettable relief system.
Figure 13A:
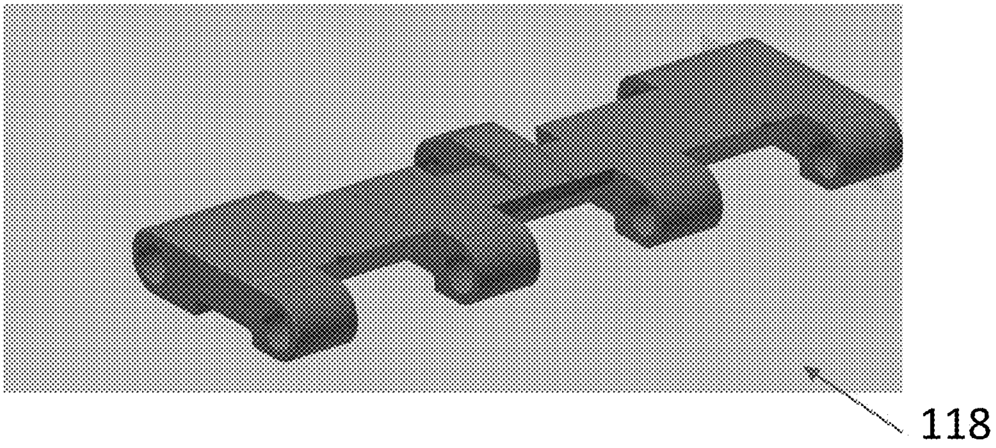
FIG. 13A is a perspective view of an exemplary first linkage member of the resettable relief system.
Figure 13B:
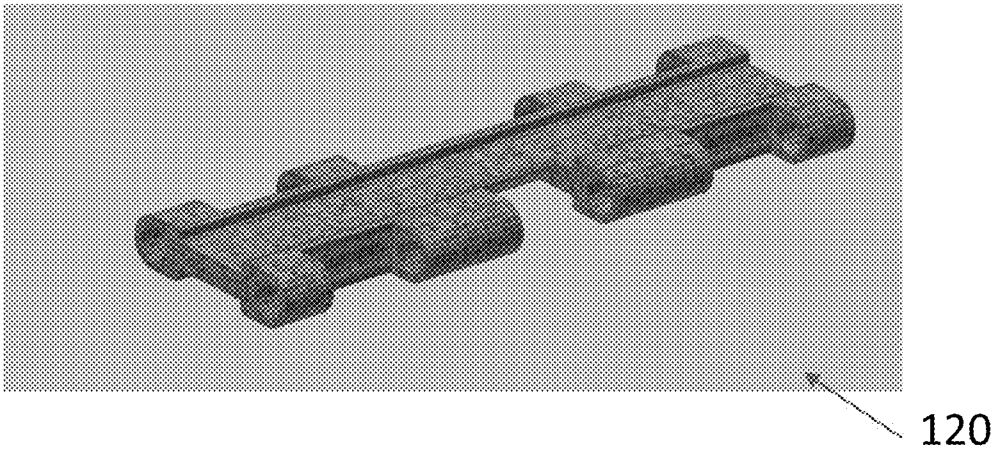
FIG. 13B is a perspective view of an exemplary second linkage member of the resettable relief system.
Figure 13C:
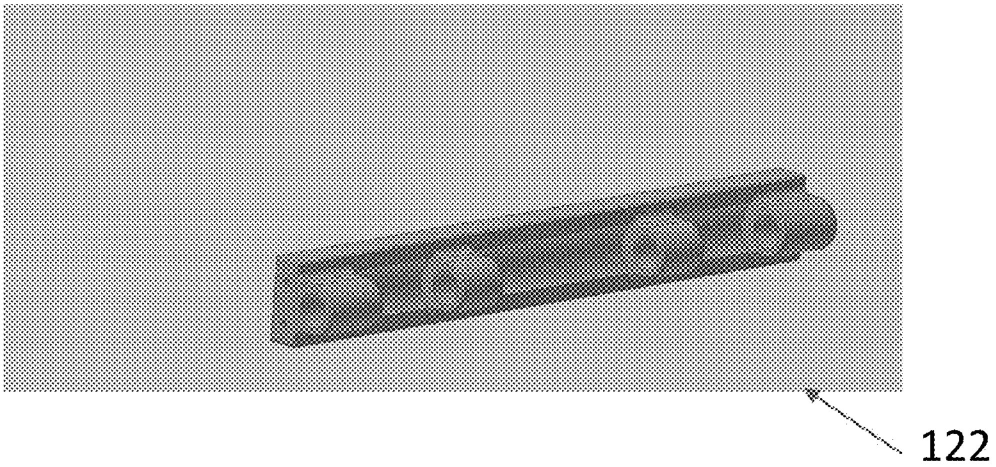
FIG. 13C is a perspective view of an exemplary first end linkage member of the resettable relief system.
Figure 13D:
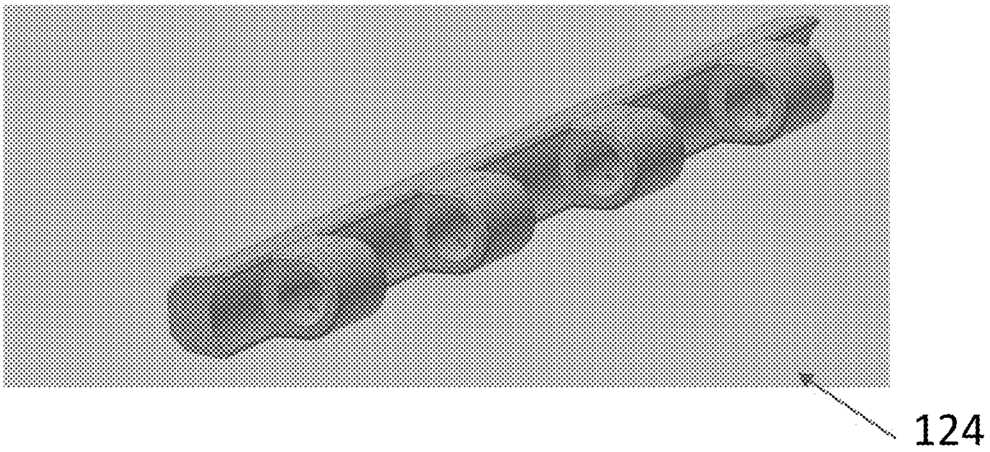
FIG. 13D is a perspective view of an exemplary second end linkage member of the resettable relief system.
Figure 14A:
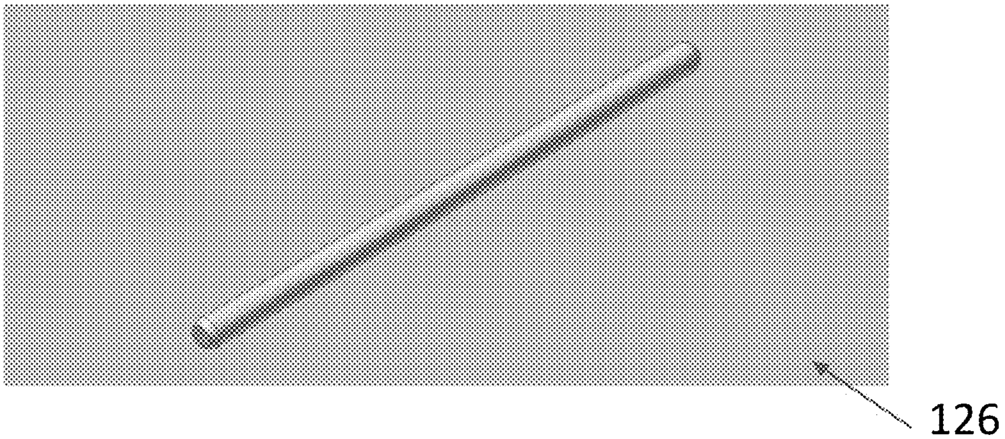
FIG. 14A is a perspective view of an exemplary shaft of the resettable relief system.
Figure 14B:
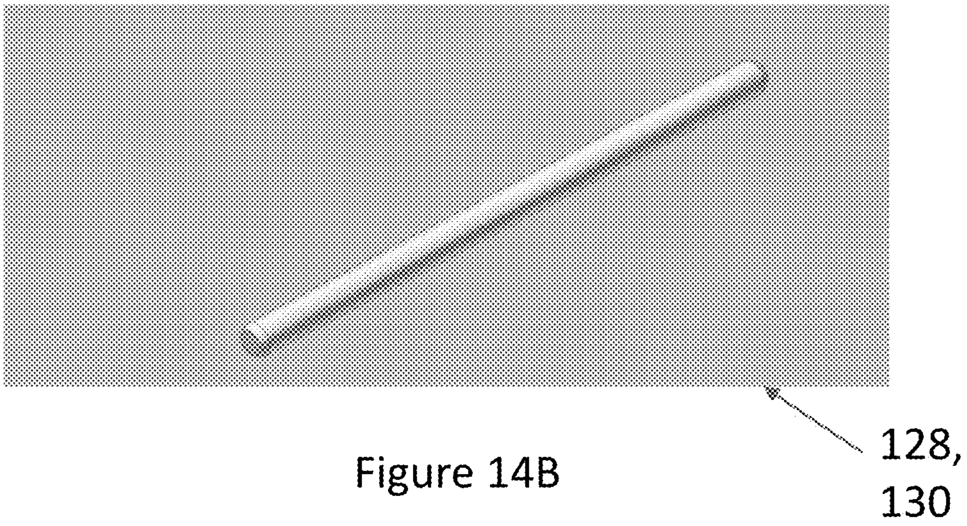
FIG. 14B is a perspective view of another exemplary shaft of the resettable relief system.
Figure 15:
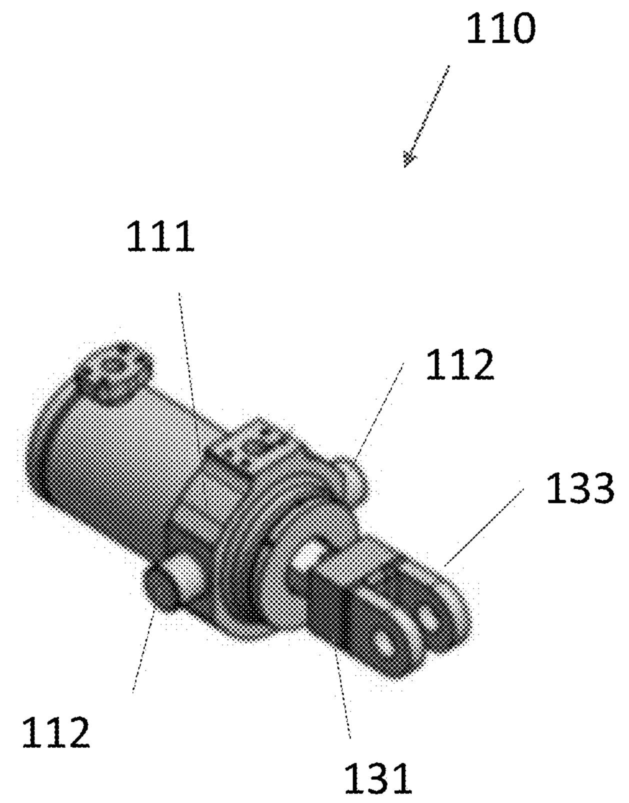
FIG. 15 is a perspective view of an exemplary hydraulic device of the resettable relief system.

FIG. 4 and FIG. 5 illustrate an exemplary resettable relief system 100 for a crusher 10' in an unrelieved, or active, position. The active position may facilitate the crushing of rock or other debris. FIG. 6 and FIG. 7 illustrate the resettable relief system 100 in a relieved, or inactive, position. The relieved position may facilitate the removal of particularly strong or uncrushable material and may prevent damage to the crusher 10'. The resettable relief system 100 is illustrated in isolation from the remainder of the crusher 10' in FIGS. 4-7 so that additional components and features of the relief system 100 may be seen in greater detail. FIG. 8, FIG. 9, and FIG. 10 illustrate the relief system 100 installed on the exemplary crusher 10'. FIG. 8 illustrates the relief system 100 in the unrelieved and extended positions. FIG. 9 illustrates the relief system 100 in the unrelieved and retracted positions. FIG. 10 illustrates the relief system 100 in the extended and relieved position. It is notable, that the relief system 100 may also be located in the relieved position when in the retracted position. FIG. 11 through FIG. 15 illustrate various components of the relief system 100 in isolation.

A hydraulic device 110 may be provided. In exemplary embodiments, the hydraulic device 110 may be oriented in a substantially vertical position. The hydraulic device 110 may be located above or below the linkage members 122, 118, 120, and/or 124 of the relief system 100. In exemplary embodiments, the hydraulic device 110 is suspended above or below the linkage members 122, 118, 120, and/or 124 of the relief system 100. The hydraulic device 110 may be located below the first and second crushing portion 16 and 18 of the crusher 10'. The hydraulic device 110 may be located to one side of the first and second crushing portion 16 and 18 of the crusher 10'. However, the hydraulic device 110 may be provided at location and/or in any orientation.

A first member 114 may extend from the hydraulic device 110. A first portion of the first member 114 may be connected to the hydraulic device 110 at a pivot 112. A second portion of the first member 114 may be connected to another side of the hydraulic device 110 at a second pivot 113. A second member 116 may extend from the hydraulic device 110. A first portion of the second member 116 may be connected to the hydraulic device 110 at the pivot 112. A second portion of the second member 116 may be connected to the hydraulic device 110 at the second pivot 113. In this way, the first and second members 114 and 116 may each be connected to both sides of the hydraulic device 110, though such is not required. In exemplary embodiments, the second member 116 is connected to the pivot 112 inside the first member 114 and the first member 114 is connected to the second pivot 113 inside the second member 116, though any arrangement is contemplated.

The first and second members 114 and 116 may comprise a U-shape, arch, or other curvature, shape, or design to facilitate movement around the hydraulic device 110, though any shape of the first and second members 114 and 116 is contemplated. A collar 111 may surround some or all of the hydraulic device 110. The pivot 112 and the second pivot 113 may be attached to, bonded with, and/or integrally formed with the collar 111. The collar 111 may be attached to, bonded with, or integrally formed with the hydraulic device 110. In exemplary embodiments, the first and second members 114 and 116 comprise one or more apertures configured to accept the first and second pivots 112 and 113, which may comprise cylindrical shafts or other shaped protrusions from the collar 111 or another component of the hydraulic device 110.

The first member 114 may be connected to a first linkage member 118 and/or a first end linkage member 122. In exemplary embodiments, the first member 114, the first linkage member 118, and the first end linkage member 122 may be connected to one another by way of a first shaft 126 which may pass through a portion of the first member 114, the first linkage member 118, and the first end linkage member 122. In exemplary embodiments, the first member 114, the first linkage member 118, and the first end linkage member 122 may each comprise apertures configured to accommodate at least a portion of the first shaft 126. The first member 114 may be connected to the first linkage member 118, and the first end linkage member 122 at substantially a mid-point of the first member 114, though such is not required. The first shaft 126 may be configured to permit rotational movement of each of the first member 114, the first linkage member 118, and the first end linkage member 122. The first shaft 126 may comprise a cylindrical shape, though other shapes may be utilized.

The second member 116 may be connected to a second linkage member 120 and/or a second end linkage member 124. In exemplary embodiments, the second member 116, the second linkage member 120, and the second end linkage member 124 may be connected to one another by way of a second shaft 130 which may pass through a portion of the second member 116, the second linkage member 120, and the second end linkage member 124. In exemplary embodiments, the second member 116, the second linkage member 120, and the second end linkage member 124 each comprise one or more apertures configured to accommodate at least a portion of the second shaft 130. The second member 116 may be connected to the second linkage member 120, and the second end linkage member 124 at substantially a mid-point of the second member 116, though such is not required. The second shaft 130 may be configured to permit rotational movement of each of the second member 116, the second linkage member 120, and the second end linkage member 124. The second shaft 130 may comprise a cylindrical shape, though other shapes may be utilized.

In other exemplary embodiments, multiple members 114 and 116 may be utilized, such as a first and second member extending from the pivot 112 and a third and fourth member extending from the second pivot 113.

The first and second linkage members 118 and 120 may be configured to accept a third shaft 128. The third shaft 128 may extend through a portion of each of the first and second linkage members 118 and 120. The third shaft 128 may be configured to permit rotational movement of the first and second linkage members 118 and 120. The first and second linkage members 118 and 120 may comprise one or more apertures configured to accommodate at least a portion of the third shaft 128. The third shaft 128 may comprise a cylindrical shape, though other shapes may be utilized.

The hydraulic device 110 may comprise a piston 131, which may be selectively extended and retracted relative to the remainder of the hydraulic device 110, such as but not limited to the collar 111. The piston 131 may be attached to the third shaft 128 and/or the first and second linkage members 118 and 120. In exemplary embodiments, the piston 131 may be connected to the third shaft 128 or other components by way of a coupling 133. The piston 131 may comprise one or more apertures configured to accommodate at least a portion of the third shaft 128. The extension or retraction of the piston 131 may be configured to cause upward or downward movement of the first and second linkage members 118 and 120.

In exemplary embodiments, without limitation, the hydraulic device 110 may be one available from Aggressive Hydraulics, Inc. of Cedar, Minnesota and/or Sunsource Inc. of Addison, Illinois. The hydraulic device 110 may, for example without limitation, comprise a bore diameter of 8 inches, a rod diameter of 3.5 inches, a test pressures of 3,500 psi, an operating pressure of 3,000 psi, a burst rating safety factor of 3.1:1 at 3,000 psi, a tensile loading safety factor of 1.6:1 at 3,000 psi, some combination thereof, or the like.

In exemplary embodiments, the hydraulic device 110 may comprise, or be in electronic communication with, a controller 140 configured to provide various instructions regarding operation of the hydraulic device 110 and/or other components of the relief system 100 as described herein. When in the unrelieved, or active, position the first and second linkage members 120 and 118 may form a substantially flat or linear surface, or may be angled upwards or downwards at an angle of less than 10 degrees from the substantially flat or linear surface. Stated another way, the angle between the first and second linkage members 120 and 118 may be 180 degrees +/−10 degrees (i.e., between 170 and 190 degrees). Other angles may be used such as, but not limited to, less than 20 degrees from the substantially flat or linear surface (i.e., between 160 and 200 degrees). The substantially flat or linear surface may be aligned with, or at an angle from, the horizon. This may bias the relief system 100 to extend upward or downward when in the relieved position. The first and second linkage members 120 and 118 may be held at the substantially flat or slightly upwards or downwards angle by way of the hydraulic device 110. The piston 131 may provide a downward or upward force on the third shaft 128, by way of the hydraulic device 110, to maintain the aforementioned angle under normal operating conditions. For example, without limitation, the hydraulic device 110 may be configured to maintain the relief system 100 in the unrelieved position while crushing forces or pressures experienced between the first and second crushing portion 16 and 18 are below a predetermined threshold. If, or when, the crushing forces or pressures experienced between the first and second crushing portion 16 and 18 reach or exceed the predetermined threshold, the hydraulic device 110 may be configured to allow or force the relief system 100 into the relieved position. Once placed in the relieved position, the relief system 100 may be configured to wait a predetermined time and/or until an appropriate signal is received before resetting the relief system 100. The predetermined threshold may be variable and may be provided based upon a desired amount of crushing force to be provided between the first and second crushing portions 16 and 18. Such operations may be made and/or adjusted by way of the controller 140. Exemplary pressures to be applied by the hydraulic device 110, along with corresponding threshold forces which result in movement of the relief system 100 into the relieved position, and the crushing forces provided between the first and second crushing portions 16 and 18, are provided in Table 1 below as examples, without limitation.

TABLE 1

| Hydraulic Pressure (PSI) | Threshold Force (Klbs.) | Crushing forces (Klbs.) |
|---|---|---|
| 800 | 32.52 | 277 |
| 1000 | 40.64 | 346 |
| 1200 | 48.77 | 415 |
| 1400 | 56.90 | 484 |
| 1600 | 65.03 | 553 |
| 1800 | 73.16 | 622 |
| 2000 | 81.29 | 692 |
| 2200 | 89.42 | 761 |
| 2400 | 97.55 | 830 |
| 2600 | 105.68 | 899 |

The forces and pressures provided in table 1 are provided as examples without limitation. Various pressures, such as but not limited to, ranging from 500 to 3500 psi may be utilized. Threshold forces, such as but not limited to, ranging from 5 Klbs to 300 Klbs may be utilized. Crushing forces, such as but not limited to, ranging from 50 Klbs to 1,500 Klbs may be utilized. These are merely exemplary and are not intended to be limiting.

In exemplary embodiments, the hydraulic device 110 may be configured to provide a certain amount of force to the first and second linkage members 120 and 118 such that when the forces experienced by the relief system 100 exceed those exerted by the hydraulic device 110, the relief system 100 is naturally forced into the relieved position. Once placed in the relieved position, the relief system 100 may be configured to wait a predetermined time, and/or until an appropriate signal is received from the controller 140, before resetting the relief system 100. Alternatively, or additionally, upon removal of the material causing the forces to exceed those exerted by the hydraulic device 110, the relief system 100 may naturally return to the unrelieved position.

Stated other ways, the hydraulic device 110 may be configured to impart a force on the third shaft 128. The piston 131 may be configured to impart a substantially vertical force such that the first and second linkage members 118 and 120 are prevented from rotating upward or downward when experiencing substantially horizontal or otherwise opposing forces generated by the crushing between the first and second crushing portion 16, which may be translated, at least in part, to the relief system 100 by way of the connection between the first or second end linkage member 122 or 124 and the first or second section crushing portions 16 or 18. The amount of force imparted by the hydraulic device 110 may be predetermined and/or electronically controlled such that horizontal or opposing forces transferred from the first and second crushing portion 16 and 18 above a predetermined threshold may be configured to cause the relief system 100 to move into a relieved, or inactive, position. In the relieved position, the piston 131 may extend and the first and second linkage members 118 and 120 may rotate upwards to create a peak, thereby bringing the first and second end linkage members 124 and 122 closer to one another. However, in other exemplary embodiments, in the relieved position, the piston 131 may retract and the first and second linkage members 118 and 120 may rotate downwards to create a valley, thereby bringing the first and second end linkage members 124 and 122 closer to one another. Regardless, when in the relieved position, the first crushing portion 16 may be positioned further from the second crushing portion 18, thereby enlarging the lower opening 22. This may relieve pressure between the first and second crushing portion 16 and 18 and/or permit rocks and other material to fall through the lower opening 22. After being moved into the unrelieved position, the relief system 100 may be configured to reset the relief system 100 by moving the first and second linking members 118 and 120 back into the unrelieved position, such as by retracting the piston 131.

For example, without limitation, the hydraulic device 110 may be configured to provide sufficient vertical forces such that the relief system 100 is maintained in the unrelieved position during normal operation to facilitate the crushing of rock and other debris. The hydraulic device 110 may be configured to move into the relieved position when a sufficiently strong material is encountered such that the horizontal or opposing forces against the first crushing portion 16 exceeds a predetermined threshold. In this way, the first crushing portion 16 may be allowed to swing back away from the second crushing portion 18, thereby enlarging the lower opening 22 and allowing the rock or other debris to pass through. This may be important, for example without limitation, when encountering strong materials, such as but not limited to rebar or steel, when crushing material, such as but not limited to concrete. The relief system 100 may prevent damage to the crusher 10'. After moving into the relieved position, the relief system 100 may be configured to reset into the unrelieved position such that further crushing may be performed. Such control may be accomplished by way of one or more controllers 140. Such controllers 140 may be electronic devices programmed with appropriate software instructions, manual devices, some combination thereof, or the like.

In exemplary embodiments, the first end linkage member 122 may be retracted so as to partially or completely be located within the housing 27, such as shown in FIG. 10, for example without limitation. The housing 27 may be attached to the frame 12 of the crusher 10'. The second end linkage member 124 may be received within a receiving portion 134 located at the first crushing portion 16. Preferably, the receiving portion 134 is on or near a bottom end of the first crushing portion 16. In exemplary embodiments, the receiving portion 134 is a recess sized to accommodate the second end linkage member 124, though any form of connection is contemplated such as, but not limited to, fasteners, bonding, adhesion, some combination thereof, or the like.

While in the unrelieved position, one or more movement imparting mechanisms 26 and/or shims 29 may be utilized to adjust the distance the relief system 100 extends from the housing 27. In this way, the distance between the first and second crushing portion 16 and 18 may be adjusted, thereby changing the size of the lower opening 22, and thus the size of material or debris permitted to pass through the lower opening 22 and potentially exit the crusher 10'. The movement imparting mechanisms 26 may include, for example without limitation, one or more motors, springs, hydraulic devices, some combination thereof, or the like. In exemplary embodiments, the movement imparting mechanisms 26 may be located within the housing 27. Alternatively, or additionally, shims 29 of various size and shape may be utilized to provide such adjustment.

The hydraulic device 110 may be mounted to the frame 12. In exemplary embodiments, the hydraulic device 110 is mounted to the frame only by way of the other components of the relief system 100, such as but not limited to, the first and second end linkage members 122 and 124. In exemplary embodiments, at least the second end linkage member 124 may be secured to a lower portion of the first crushing portion 16. For example, without limitation, the second end linkage member 124 may be received within an appropriately shaped groove in the first crushing portion 16. The first end linkage member 122 may be secured to one or more of the movement imparting mechanisms 26.

It is notable that while a single hydraulic device 110 is illustrated, any number of hydraulic devices 110 may be utilized. While a jaw type crusher 10' is illustrated, it is contemplated that the resettable relief system 100 may be utilized with other types of crushers 10'. Also, a single unit may comprise multiple crushers 10', each with one or more such relief system 100.

The relief system 100 may be capable of operating at relatively low pressures. Lower operating pressures may be achieved by way of various components of the relief system 100, such as but not limited to, the first and second members 114 and 116, the first and second linkage members 118 and 120, and the first, second, and third shafts, 126, 130, and 128 which may form a lever-type arrangement which may provide a mechanical advantage.

Figure 16A:
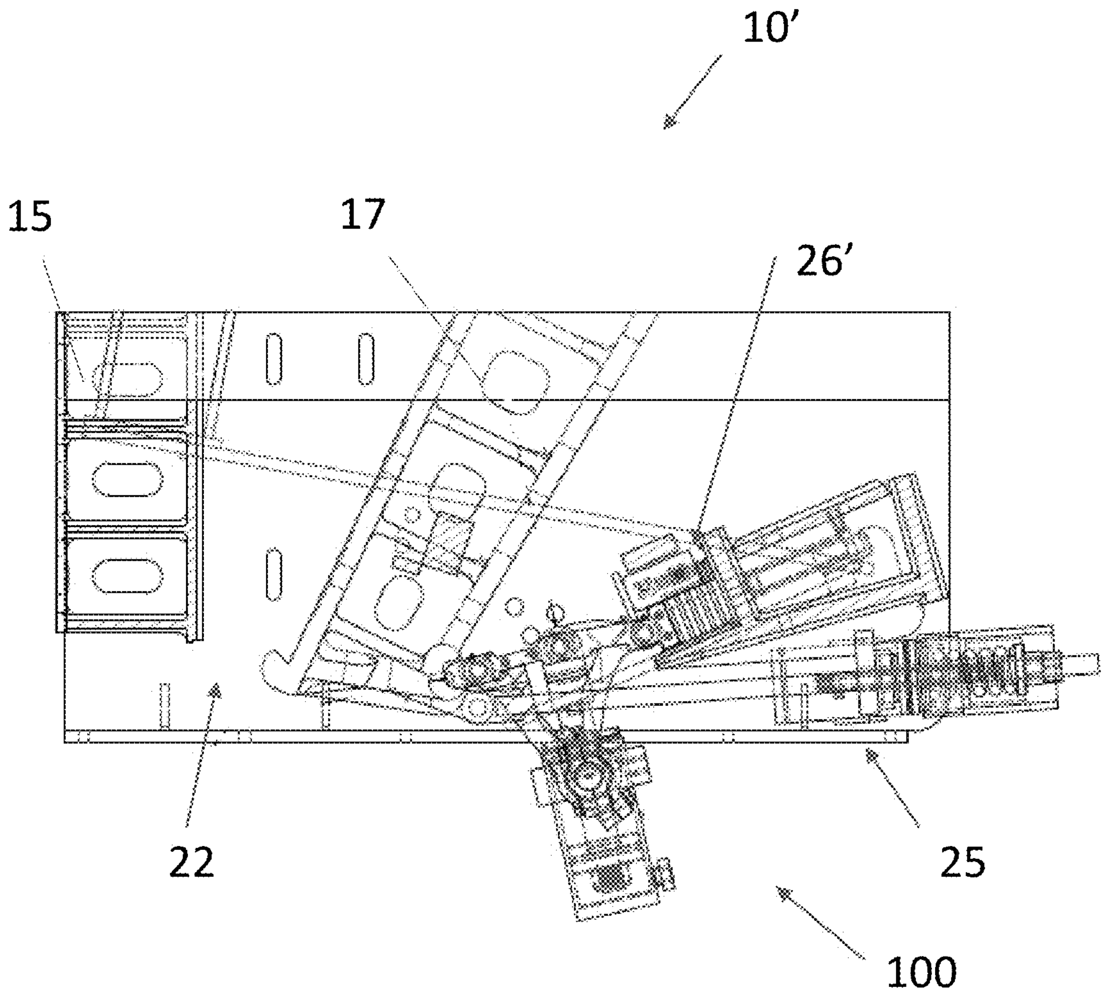
FIG. 16A is a side sectional view of the resettable relief system and another exemplary position assist device.
Figure 16C:
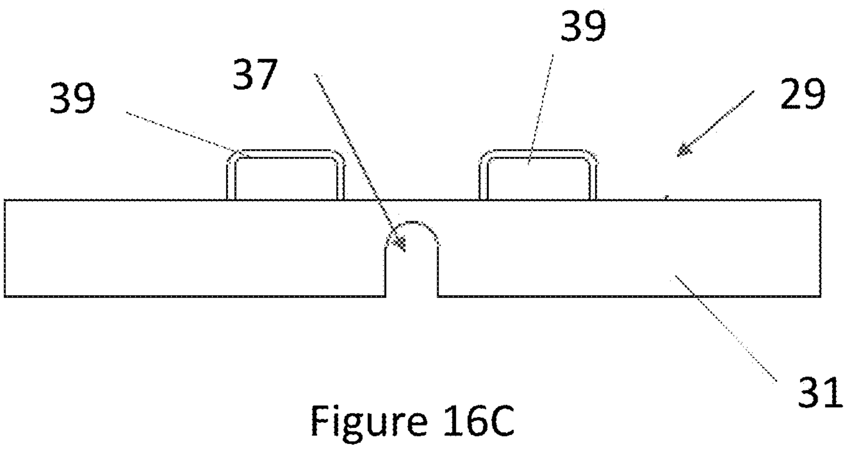
FIG. 16C is a side view of an exemplary shim for the position assist device of FIGS. 16A-C.
Figure 16B:
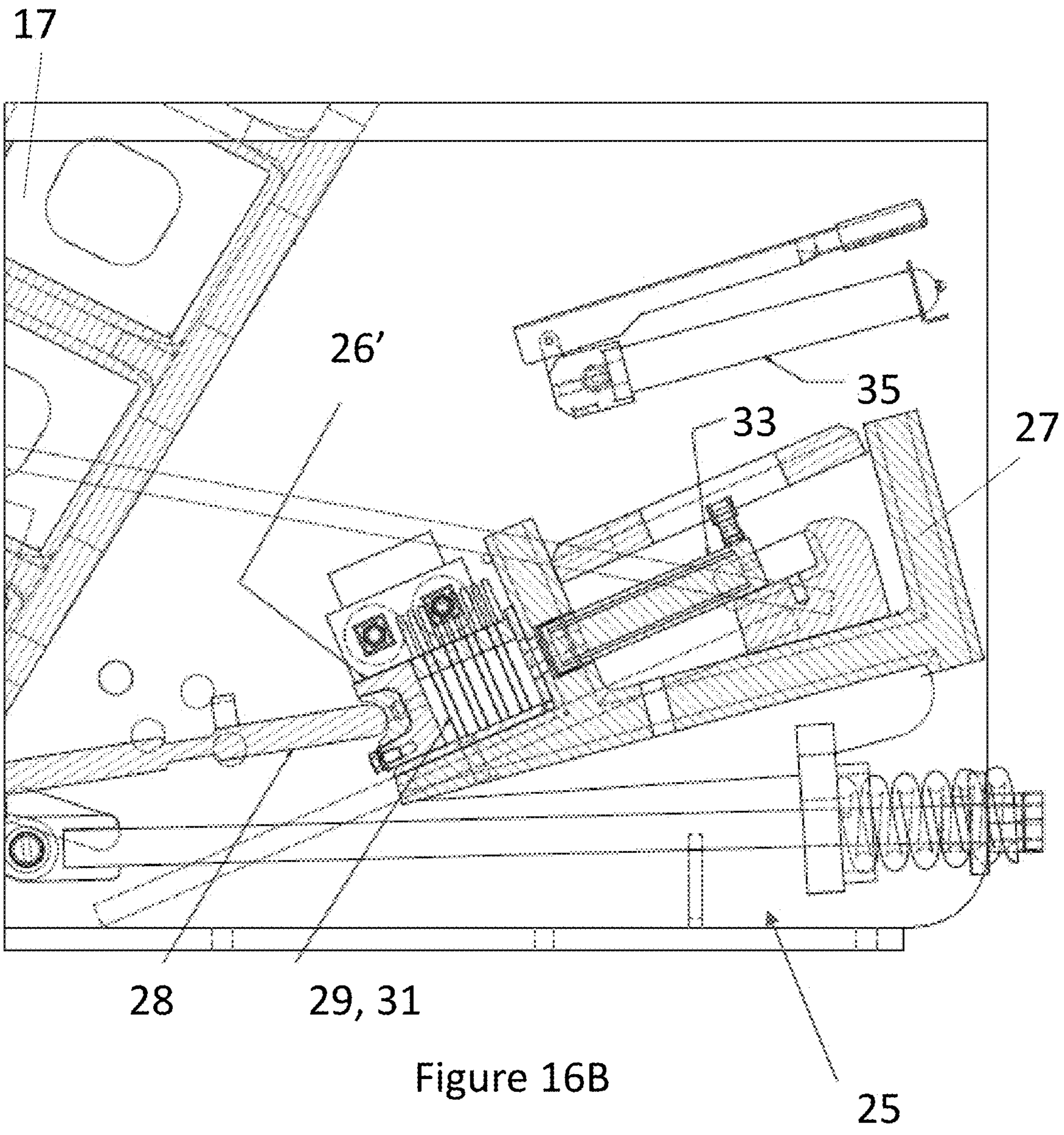
FIG. 16B is a detailed side sectional view of the position assist device.

FIG. 16A illustrates another exemplary position assist device 26' in accordance with the present invention. While FIG. 16B illustrates the position assist device 26' with a traditional relief bar 28, the position assist device 26' may be used with the resettable relief system 100. As shown in FIG. 16C, the position assist device 26' and/or 26 may utilize a number of shims 29. Each shim 29 may comprise a body 31. The size of the body 31 may dictate the increments of adjustability available from the position assist device 26', and thus positioning of the second section 17 and the size of the lower opening 22. One or more mating surfaces 39 may be located at the body 31. The mating surfaces 39 may comprise indentation, protrusions, some combination thereof, or the like which may be configured to mate with corresponding indentations, protrusions, some combination thereof, or the like, which may be provided, for example without limitation, on opposing surfaces of the shims 29.

Each shim 29 may comprise an aperture configured to receive a hydraulic ram 33. The hydraulic ram 33 may be mounted to the housing 27 and may be configured for extension to temporarily position the second section 17 so that shims 29 may be added or removed. Adding or removing the shims 29 may incrementally adjust the size of the lower opening 22 during normal operations of the crusher 10 or 10'. Operation of the hydraulic ram 33 may be achieved by way of a manual pump 35, though any kind or type of pump may be utilized. The manual pump 35 may be in fluid communication with the hydraulic ram 33 by way of one or more hoses, values, ports, connectors, some combination thereof, or the like.

Figure 17A:
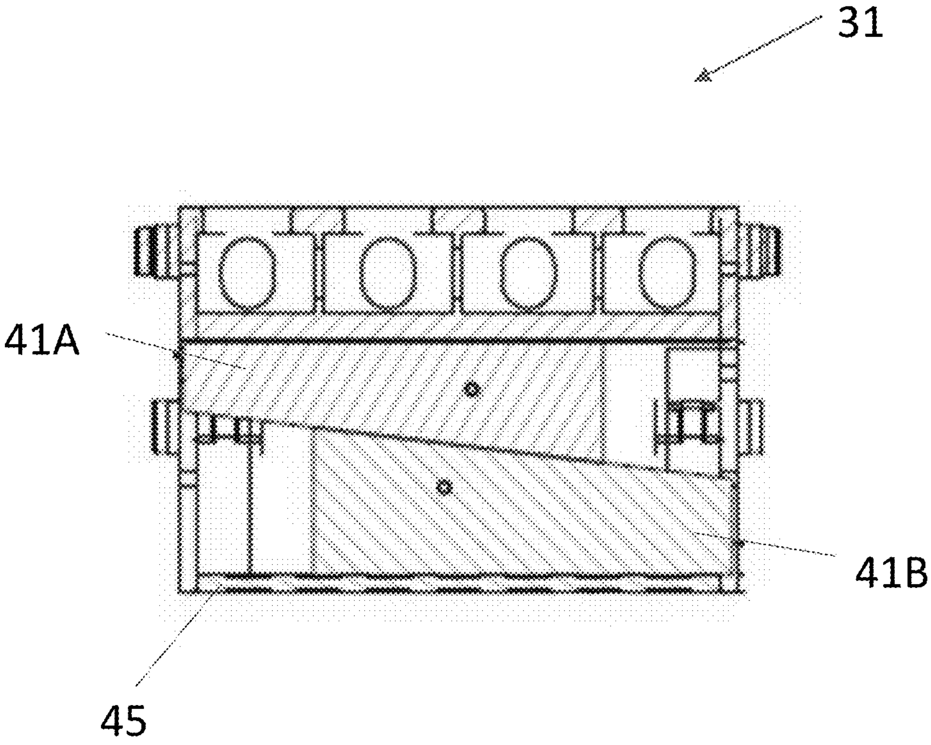
FIG. 17A is a top sectional view of an exemplary wedge for the position assist device of FIGS. 16A-C.
Figure 17B:
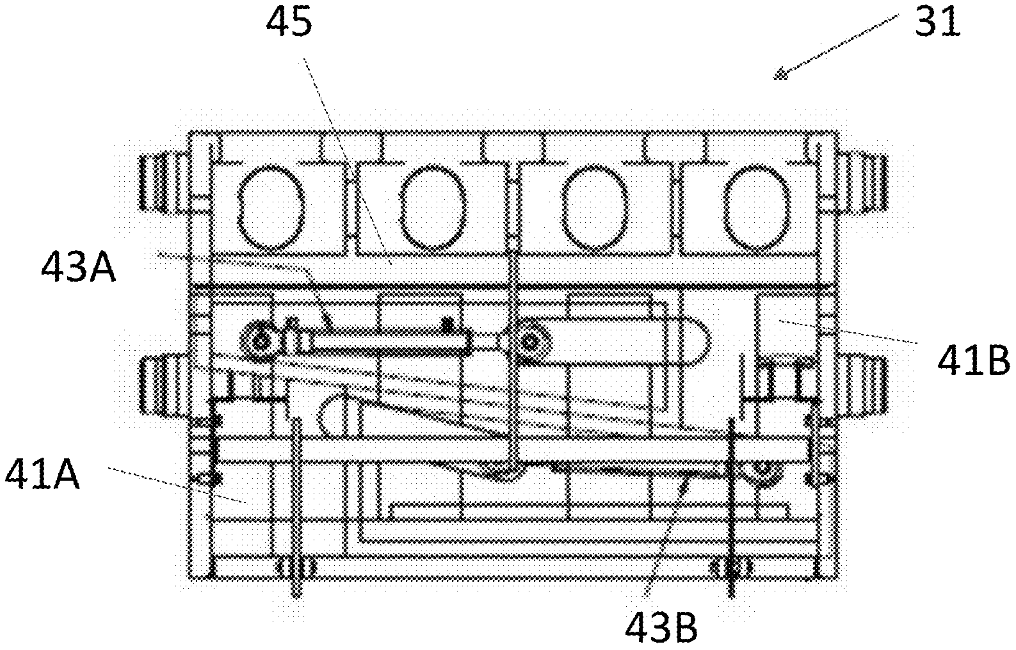
FIG. 17B is a top view of the wedge of FIG. 17A.
Figure 18:
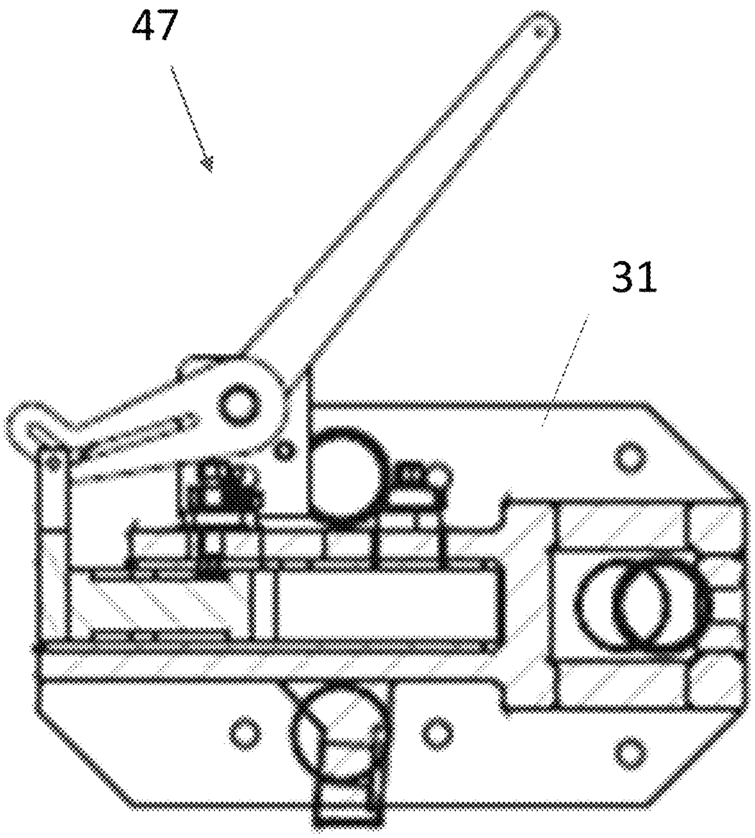
FIG. 18 is a top view of an exemplary hydraulic device for use with the wedges of FIGS. 17A-17B.

FIG. 17A through FIG. 17C illustrate wedges 31 which may be utilized in place of, or in combination with, the shims 29. Each wedge 31 may comprise one or more angled block 41A, 41B. The angled blocks 41A, 41B may be driven laterally, in exemplary embodiments, to cause the wedge 31 to increase or decrease in length. Hydraulic devices 43A, 43B may be secured between the angled blocks 41A, 41B and a housing 45 for the wedge 41 to realize the relative movement of the blocks 41A, 41B. FIG. 18 illustrates an exemplary user actuation device 47 for actuation of the hydraulic devices 43A, 43B. While a lever is illustrated, any kind or type of user actuation device 47 may be utilized.

Figure 19:
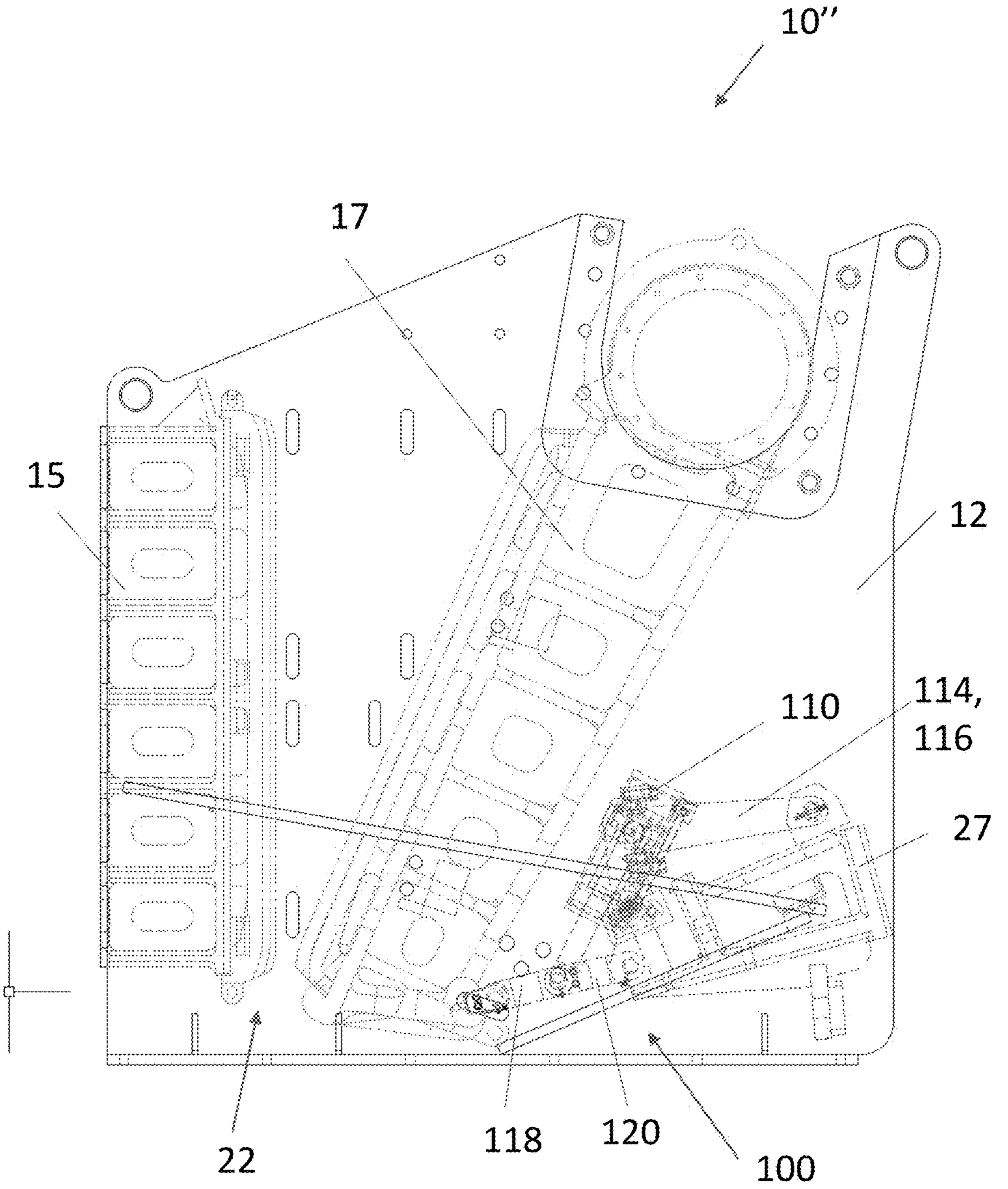
FIG. 19 is a side sectional view of another exemplary embodiment of the crusher and relief system.

FIG. 19 illustrates another exemplary embodiment of the crusher 10". The hydraulic device 110 may be mounted above the first and second linkage members 118 and 120. The first and second linkage members 118 and 120 may form a substantially linear surface when in the unrelieved position. For example, the substantially linear surface may vary up to 20 degrees, positive or negative, from linear in one or more places. The hydraulic device 110 may exert a force substantially perpendicular to, or at an angle to, the linear surface created by the first and second linkage members 118 and 120, for example such that a primary component of the force extends perpendicular to a longitudinal axis of the first and second linkage members 118 and 120 when in the unrelieved position. The same or different first and second members 114, 116 may secure the hydraulic device 110 to the frame 12 and/or the housing 27.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A crusher apparatus comprising:

a material crushing portion having a first crushing portion and a second crushing portion, wherein the first crushing portion is movable towards the crushing portion;

a linkage subassembly connected to said first crushing portion, said linkage subassembly having a first member and a second member, where said first member is connected to said second member at a pivot; and a force inducing subsystem configured to exert a counterforce of a predetermined threshold amount to said first and second members sufficient to maintain said linkage subassembly in an unrelieved position where the first member and the second member of the linkage subassembly are longitudinally aligned to resist movement of the first crushing portion away from the second crushing portion, until a crushing force exerted on said first crushing portion is sufficient to cause said linkage subassembly to move into a relieved position where the first member and the second member of the linkage subassembly rotated about the pivot and out of longitudinal alignment to reduce or eliminate resistance to movement of the first crushing portion away from the second crushing portion.

2. The crusher apparatus of claim 1 wherein:

the force inducing subsystem comprises a hydraulic piston.

3. The crusher apparatus of claim 1 wherein:

the linkage subassembly comprises a first fixed end linkage member and a second end linkage member, where the first member extends from the first end linkage member to e second member, and the seco member extends from the first member to the second end linkage member;

rotational movement of the first member the second member of the linkage subassembly at the pivot causes vertical movement of the pivot; and the force inducing subsystem is connected to a mid-portion of the linkage subassembly located between the first end linkage member and the second end linkage member.

4. The crusher apparatus of claim 3 wherein:

the force inducing subsystem is configured to exert the counterforce at the pivot.

5. The crusher apparatus of claim 3 wherein:

the pivot is provided at the mid-portion of the linkage subassembly;

said first member is rotatable about a secondary pivot located at a connection between the first end linkage member and said first member;

said second member rotatable about a tertiary pivot located at a connection between the second end linkage member and said second member; and the secondary pivot and the tertiary pivot do not move vertically with the pivot as the linkage assembly is moved between the unrelieved position and the relieved position.

6. The crusher apparatus of claim 5 wherein:

the first member comprises a series of apertures;

the second member comprises a series of apertures;

the linkage subassembly comprises a shaft extending through the series of apertures of the first and second members to provide the pivot; and the force inducing subsystem is connected to the shaft.

7. The crusher apparatus of claim 6 wherein:

the first member comprises an additional series of apertures;

the second member comprises an additional series of apertures;

the linkage subassembly comprises a first end linkage member comprising the first end linkage member and a series of aperture, a second end linkage member comprising the second end linkage member and a series of aperture, a second shaft extending through the additional series of apertures of the first member and the series of aperture of the first end linkage member to provide the secondary pivot, a third shaft extending through the additional series of apertures of the second member and the series of aperture of the second end linkage member to provide the tertiary pivot.

8. The crusher apparatus of claim 1 further comprising: support members pivotably connecting the force inducing subsystem to the linkage subassembly to maintain a position of the force inducing subsystem within reachable distance of the linkage subassembly when the linkage subassembly is moved between the relieved position and the unrelieved position.

9. The crusher apparatus of claim 1 further comprising: a controller in electronic communication with said force inducing subsystem to automatically signal said force inducing subsystem to move into a relieved position when the crushing force exceeds a predetermined crushing threshold force amount.

10. The crusher apparatus of claim 1 further comprising: a first end linkage member connected to said first member and a second end linkage member connected to said second member, wherein said first and second end linkage members form part of said linkage subassembly and are interoperable with said first member and said second member to form said relieved position and said unrelieved position.

11. The crusher apparatus of claim 1 wherein: the linkage subassembly extends longitudinally in a first direction when in the unrelieved position; and the force inducing subsystem is configured to exert a force in a second direction having a primarily component perpendicular to the first direction at a mid-portion of the linkage subassembly.

12. The crusher apparatus of claim 11 wherein: the counterforce is any force ranging from 500 to 3500 psi.

13. A crusher apparatus comprising:
a material crushing portion having a first crushing portion and a second crushing portion, wherein the first crushing portion is movable relative to the second crushing portion;
a linkage subassembly connected to said first crushing portion, said linkage subassembly having a first member and a second member, where each of said first member and said second member are connected at a pivot for relative rotational movement; and
a force inducing subsystem configured to exert a counterforce of a predetermined threshold amount to said first and second members sufficient to maintain said linkage subassembly in an unrelieved position where the linkage subassembly extends longitudinally in a first direction, until a crushing force exerted on said first crushing portion is sufficient to cause said linkage subassembly to move into a relieved position, wherein the force inducing subsystem is configured to exert a force in a second direction having a primarily component perpendicular to the first direction at a mid-portion of the linkage subassembly.

14. The crusher apparatus of claim 13 wherein: the counterforce is any force ranging from 500 to 3500 psi.

15. A crusher apparatus comprising:
a material crushing portion having a first crushing portion and a second crushing portion, wherein the first crushing portion is movable towards the second crushing portion;
a linkage subassembly comprising a first end linkage member connected to the crusher apparatus, a second end linkage member connected to the first crushing portion, a first member pivotably connected to, and extending from, the first end linkage member at a first pivot, and a second member pivotably connected to, and extending from, the first member at a second pivot and the second end linkage member at a third pivot such that said second pivot is located at a mid-portion of the linkage subassembly, wherein rotation of the first member relative to the second member at the second pivot causes the second pivot to move vertically; and
a force inducing subsystem configured to exert a counterforce of a predetermined threshold amount to said second pivot sufficient to maintain said linkage subassembly in an unrelieved position where said second pivot, said first member, and said second member are aligned, until a crushing force exerted on said first crushing portion is sufficient to cause said linkage subassembly to move into a relieved position where said second pivot moves vertically relative to said first pivot and said third pivot, and said first end linkage member and said first pivot moves towards said second end linkage member and said third pivot.

16. The crusher apparatus of claim 15 wherein:
the first member comprises a series of apertures;
the second member comprises a series of apertures;
the linkage subassembly comprises a shaft extending through the series of apertures of the first and second members to provide the second pivot; and
the force inducing subsystem is connected to the shaft.

17. The crusher apparatus of claim 16 wherein:
the first member comprises an additional series of apertures;
the second member comprises an additional series of apertures;
the first end linkage member comprises a series of aperture, the second end linkage member comprises a series of aperture, a second shaft extends through the additional series of apertures of the first member and the series of aperture of the first end linkage member to provide the first pivot, a third shaft extending through the additional series of apertures of the second member and the series of aperture of the second end linkage member to provide the third pivot.

18. The crusher apparatus of claim 15 further comprising: a movement imparting mechanism connecting the first end linkage member to the crusher apparatus and configured to axially reposition and selectively fix the first end linkage member relative to the first crushing portion.

* * * * *